United States Patent [19]

Markel et al.

[11] Patent Number: 4,689,187
[45] Date of Patent: Aug. 25, 1987

[54] METHOD FOR SHAPING PLASTIC MATERIALS

[75] Inventors: Kurt Markel, Glauchau; Werner Berger, Dresden, both of German Democratic Rep.

[73] Assignee: VEB Kombinat Textima, Karl Marx Stadt, German Democratic Rep.

[21] Appl. No.: 702,100

[22] Filed: Feb. 15, 1985

[30] Foreign Application Priority Data

Mar. 5, 1984 [DD] German Democratic Rep. .................................... 2605568

[51] Int. Cl.$^4$ ............................................ B29C 47/44
[52] U.S. Cl. ................................ 264/40.5; 264/40.7; 264/171; 264/211.23; 264/349; 425/145; 425/146; 425/149; 425/204; 425/208
[58] Field of Search ................... 264/40.5, 40.6, 40.7, 264/176 R, 171, 349, 211.23; 425/145, 146, 149, 204–208, 379 R

[56] References Cited

U.S. PATENT DOCUMENTS

| | | | |
|---|---|---|---|
| 1,780,948 | 11/1930 | Sherman | 264/237 |
| 3,026,564 | 3/1962 | Kohlwey | 425/380 |
| 3,224,739 | 12/1965 | Schuur | 425/204 |
| 3,295,552 | 1/1967 | Powell et al. | 264/171 |
| 3,489,830 | 1/1970 | Grigull | 264/102 |
| 3,577,588 | 5/1971 | Chisholm | 425/131.1 |
| 3,632,256 | 1/1972 | Kasting et al. | 425/205 |
| 3,639,573 | 2/1972 | Port | 264/DIG. 47 |
| 3,803,286 | 4/1974 | Nakatsuka et al. | 264/176 R |
| 3,924,841 | 12/1975 | Shinmoto | 425/208 |
| 4,212,543 | 7/1980 | Bersano | 425/204 |

FOREIGN PATENT DOCUMENTS

| | | | |
|---|---|---|---|
| 1187010 | 2/1965 | Fed. Rep. of Germany | 425/149 |
| 2202303 | 7/1973 | Fed. Rep. of Germany | 425/208 |
| 51-76358 | 7/1976 | Japan | 425/208 |
| 1167850 | 10/1969 | United Kingdom | 425/204 |
| 727473 | 4/1980 | U.S.S.R. | 425/208 |

Primary Examiner—Jeffery Thurlow
Attorney, Agent, or Firm—Jordan and Hamburg

[57] ABSTRACT

The invention includes a method and an extrusion apparatus for shaping plastic materials particularly those of high molecular weight, whereby the temperature distribution in an extrusion cylinder allows for the build-up of very high pressures and all axial pressure forces are absorbed by a two-sided extruder screw, the extrusion cylinder and, in some instances, the therein contained plastic material. In practicing the method, the plastic material in a flowing state, and at a positive pressure, is continuously conveyed to an extrusion apparatus, and subsequent to its entrance in an extrusion cylinder and before its discharge is cooled to a temperature below the solidification point, not only from the outside by a cooling source in the extrusion cylinder but also from the inside by a cooling source in the interior of the extruder screw.

The present invention makes possible the production of materials of improved strength and elasticity, which can be molded to synthetic threads, films and splittable films.

7 Claims, 3 Drawing Figures

METHOD FOR SHAPING PLASTIC MATERIALS

The invention relates to a method and an extrusion apparatus for shaping plastic materials particularly of high molecular weight, wherein one or more streams of said material are conveyed off-center to a two-sided extruder screw mounted in an extrusion cylinder, and wherein the screw can be shifted a short distance in axial direction by material undergoing extrusion. The two sides of the screw are rigidly connected to each other and are provided with threads of opposite pitch. The feed material is conveyed to the center of the extrusion cylinder by the screw and is centrally discharged from this location. The extrusion apparatus comprises further a driving arrangement for operating the screw and means at the feed openings for loading the extrusion cylinder, as well as a discharge head for discharging the product.

BACKGROUND OF THE INVENTION

Extrusion apparatus utilizing an extruder screw housed in an extrusion cylinder are well-known in the art. In U.S. Pat. No. 3,577,588, for example, the material to be treated is conveyed according to FIG. 1 to two funnel-shaped hoppers. The two-sided, axially movable extruder screw then conveys the material from the sides of the extrusion cylinder to its center, where the material is discharged. As described by the foregoing Patent, there is in normal operation an equilibrium of forces in the two sections of the extrusion cylinder supported by a hydraulic system. Therefore, the screw is usually located in a center position without being acted upon by any one-sided axial pressure stress. If there occurs a greater pressure on one side of the cylinder than on the other, for instance, because of the increasing resistance of the supplied material to be extruded, then the screw shifts slightly. In the range of the up to now generally occurring pressures in extrusion apparatuses of 5 to 50 MPa, because of the provided screw having increasing pitch towards the center of the cylinder, the differential force resulting from the disequilibrium of the pressure acts mainly as tractive force of the screw and less as axial compressive force and is at a level which the known designs of axial thrust bearings can absorb without any problems. If an increased differential force results from the mentioned pressure conditions, then the hydraulic system acts on the screw with an axially directed equalization force, which offsets the differential force and is absorbed by a pivot representing the connecting element between the rotating and shiftable worm shaft, as well as the hydraulic cylinder which can only be moved back and forth. The pivot connecting the screw and the hydraulic cylinder comprises conventional axial thrust bearings and a radial bearing. When the equalization force corresponds to the occurring differential force, the screw slides again back into the center position.

The described extrusion apparatus has the definite disadvantage that is does not provide thermoplastic polymers or materials with the higher orientations that can be attained at pressures of 300 to over 1000 MPa, because the extrusion apparatus and its practical operation are unsuitable for such pressure conditions. The shown simple conveyance of material through the funnel-shaped hoppers results in different degrees of loading on each side of the extrusion cylinder. At high pressures, these loadings generate extraordinarily great differential forces, which cannot be absorbed by conventional axial thrust bearings in a pivot. Consequently, the known extrusion apparatus is subject to break down at least at its axial thrust bearings. Furthermore, the disclosed working method does not have the qualities which would make possible the build-up of the intended high pressures in the extrusion cylinder.

Furthermore, there is known a method for pressing plastic masses, particularly acrylonitrile polymer products, in a moldable state, at a pressure of up to 5000 MPa, through a nozzle (DE-OS No. 2,161,182). This method allows attaining high degrees of orientation of the polymers. However, the method allows only a discontinuous working method, which makes industrial treatment of plastic masses uneconomical.

SUMMARY OF THE INVENTION

An object of the invention is to eliminate the foregoing disadvantages and to have the capability of building up pressures of magnitudes of 300 to over 1000 MPa in the extrusion cylinder, in order to shape materials which up to now could not be shaped in a continuous, industrial operation. The invention allows the production of materials of a higher orientation of the molecules, and thus is intended particularly for the production of shaped articles, such as synthetic threads, films and splittable films which, among other features, have improved properties, such as strength and elasticity.

A further object of the present invention is the creation of a method and an extrusion apparatus for shaping plastic materials, particularly those of high molecular weight, wherein the temperature distribution in the extrusion cylinder allows the build-up of very high pressures and whereby, during the operation of the apparatus, all axial pressures are absorbed by a two-sided extruded screw, an extrusion cylinder and, in some cases, the plastic material being extruded.

In accordance with the present invention, a plastic material is continuously conveyed under positive pressure in a flowing state to an extrusion apparatus, wherein one or more streams of said material are conveyed off-center to a two-sided extruder screw mounted in an extrusion cylinder, and wherein the screw can be shifted a short distance in axial direction by material undergoing extrusion. The two sides of the screw are rigidly connected to each other and are provided with threads of opposite pitch. The feed material is conveyed to the center of the extrusion cylinder by the screw and is centrally discharged from this location. The extrusion apparatus comprises further a driving arrangement for operating the screw and means at the feed openings for loading the extrusion cylinder, as well as a discharge head for discharging the product. After entering into the extrusion cylinder and before its discharge, the material is cooled not only from the outside by a cooling source in the extrusion cylinder but also from the inside by a cooling source in the interior of an extruder screw, to a temperature lying below the solidification point, and the material flowing after it, as well as the solidified material, is conveyed by the screw in the direction of a discharge location of the extrusion cylinder.

In a variant of the above solution, the solidified material is discharged from the extrusion cylinder.

In a further embodiment of the method, the solidified material is brought again into a flowable state before its discharge, and is subsequently discharged in this state from the extrusion cylinder.

For the utilization of an extrusion apparatus with a two-sided extruder screw mounted in the extrusion cylinder, whereby the screw is movable over a short distance in axial direction by means of the material to be extruded, and whereby such material is supplied off-center from two sides and is conveyed by means of the screw to the center of the extrusion cylinder, as well as being centrally removed from this location, there exists a modification of the method wherein the material to be shaped is first brought into a flowable state in two conventional feed extruders, which are connected in series before the main extruder. Initially at approximately the same positive pressure, the material is then continuously conveyed from the feed extruders through the particular intake openings to both sides of the screw. The intake openings are located on the outer ends of the extrusion cylinder. Subsequent to entering into the extrusion cylinder and before being discharged, the mass is cooled to below the solidification point not only from the outside by a cooling source in the extrusion cylinder but also from the inside by a cooling source in the interior of the screw located at both sides of the latter. The screw subsequently continues to convey the flowing material and the solidified material. During this time, at a change of the pressure conditions, the screw slides back and forth in axial direction, and thereby, by means of a position indicator connected to a process computer gives pulses to charge control valves of the feed extruders, and the flow of the material supplied from the feed extruders thus increases the pressure on the side having lower pressure, and vice versa.

For the execution of the above mentioned method is provided an extrusion apparatus for plastic materials, comprising an extrusion cylinder having a feed opening at each end and a discharge location at the center, wherein the discharge location is radially directed with respect to the cylinder and, a two-sided extruder screw movable over a short distance in axial direction by means of the material to be shaped is mounted in the extrusion cylinder. The screw is connected to axial pressure- and radial bearings, and its two sides are fixedly connected to each other and have opposite pitch of the screw threads. The apparatus also comprises a drive apparatus for the operation of the screw and means for loading the extruder cylinder at the feed openings, as well as a discharge head in the center of the extrusion cylinder for discharging the extruded product, characterized by the following features:

(a) As means for loading the extrusion cylinder, there is provided at each of the feed openings a conventionally known feed extruder producing a flowing stream; the feed extruder is connected in series before the main extruder.

(b) The force-absorbing components of the axial thrust bearings are at a distance from the stressing components during the operating state of the extrusion apparatus.

(c) The extruder screw is equipped with a position indicator which signalizes positional changes of the screw to a process computer.

(d) Between each feed extruder and the main extruder, there is arranged a charge control valve which receives for its operation adjustment signals from the process computer.

(e) At each feed zone, there is located a tempering unit.

(f) Each intensive cooling zone is equipped with a cooling unit.

(g) Both sides of the extruder screw are provided with hollow spaces containing a cooling source, which are connected to each side to a cooling unit in order to perform an interior cooling.

(h) On the discharge head are provided further tempering units.

(i) The means (e) to (h) are connected to a process computer.

The present invention makes possible the practical extrusion of plastic materials at pressures of up to over 1000 MPa. Thus it is possible to produce materials of an extraordinarily high degree of orientation. They can be shaped into synthetic threads, films and splittable films having properties suitable for textile applications and improved strength and elasticity.

Furthermore, because such high pressures can be used, the requirement for mixing or dispersing flowable masses of considerably varying parameters is met, which is possible only at extremely high shearing gradients, requiring such high pressures.

Due to a compensation of the axial forces within the extrusion apparatus, essentially constructional dimensions as generally applicable in processing machine construction can be observed.

The invention is further illustrated by the drawings wherein:

FIG. 1 is a schematic diagram of an extrusion apparatus suitable for the execution of the method, and FIG. 2 is a diagram indicating pressure and temperature distributions with respect to individual zones of the extrusion cylinder.

Detailed Description of Invention

Figure 1:
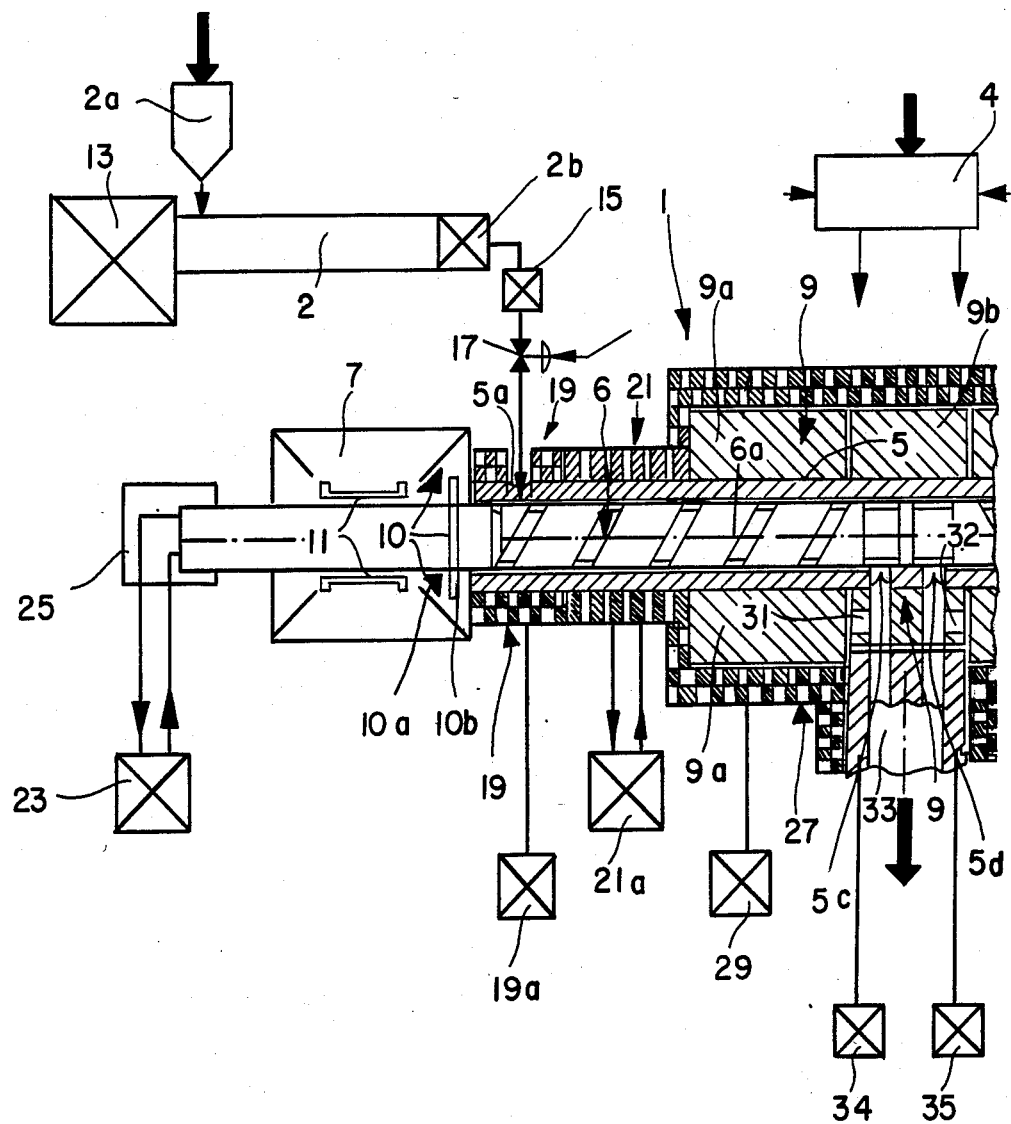
Figure 1A:
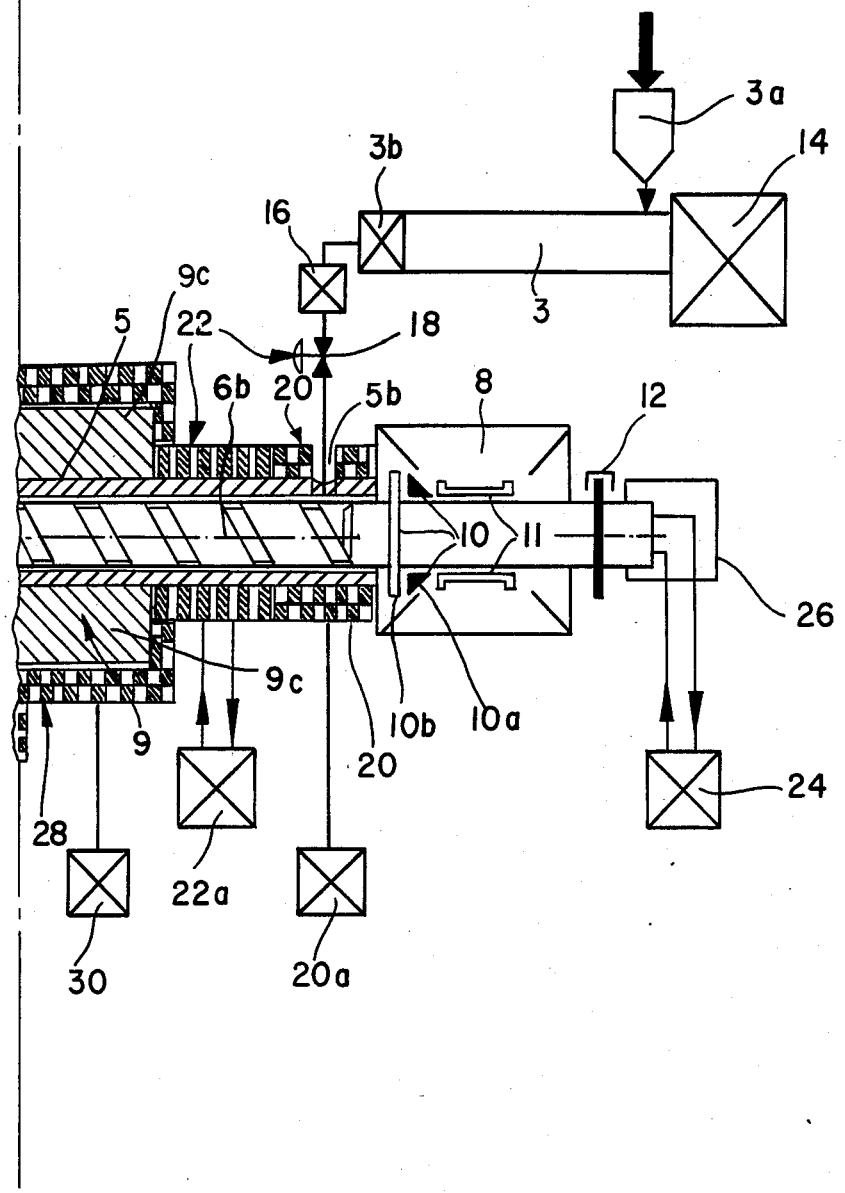

As shown in FIG. 1, the extrusion apparatus comprises a main extruder 1, and connected in series before the latter, two feed extruders 2; 3 and a process computer 4. The main extruder 1 contains a two-sided extruder screw 6 mounted in an extrusion cylinder 5; screw 6 is slidable in axial direction for a short distance by means of the flowable material to be shaped. Feed extruders 2; 3 are identical, conventional screw conveyers which operate to yield flowable and continuously conveyed material.

Process computer 4 is a conventional unit which is capable by means of a given program to translate the temperature-, pressure- or path parameters determined on the extrusion apparatus into operating and function signals for its individual components. Main extruder 1 is equipped with two drive apparatuses 7; 8, each of which engages at the respective end of two-sided extruder screw 6 in order to place the latter into rotation. Drive apparatuses 7; 8 are conventional means of their kind, each one having a strong motor and a corresponding drive, with motors connected to each other by means of an electrical shaft, so that both drives have approximately even loads.

The flowable plastic feed material is supplied to main extruder 1 off-center from two sides under positive pressure, and is then conveyed to the center of extrusion cylinder 5, and is centrally removed from this location. The material is conveyed from both sides to the center of extrusion cylinder 5 because the threads of screw 6, with respect to its two fixedly connected sides 6a; 6b, are provided with opposite pitch which are arranged so that when screw 6 is rotated to the right, the mass is pushed towards the center. For the feeding of main extruder 1 with flowable material from extruders 2; 3, extrusion cylinder 5 is provided at its ends with respective feed openings 5a; 5b, and in the center with discharge openings 5c; 5d, which, in respect to cylinder 5 are arranged in radial direction. Feed openings 5a; 5b are sealed towards the direction of the drive apparatus.

Discharge openings 5c; 5d end in a three-part pressure-resistant discharge head 9, which is equipped with reinforcing means 9a; 9b; 9c, particularly with shrink-fitted reinforcement housings for the extrusion cylinder 5, so that very high pressures can be withstood. Axial pressure and radial bearings 10; 11 are assigned to screw 6 at its two sides 6a; 6b, so that, during the operating state of the extrusion apparatus, the force-absorbing components 10a of the axial thrust bearing 10 do not come into contact with the stressing components 10b—during this phase, the latter two are at a distance from each other, whereby an axial shiftability of ±15 mm is possible for screw 6 in extrusion cylinder 5.

At one side 6b (6a) of screw 6 is installed a position indicator 12 which, during operation, signalizes the changes of position of screw 6 to the process computer 4.

An example of a cycle of operation of the foregoing extrusion apparatus in carrying out the method of the present invention, wherein feed extruders 2; 3 equipped with feed hoppers 2a; 3a are supplied with plastic feed material, is as follows.

From feed hoppers 2a; 3a, granulated polyethylene is supplied to the identical feed extruders 2; 3 and is melted therein, so that the feed extruders 2; 3 thus can also be designated as melt extruders. At feed extruders 2; 3 are installed measuring heads 2b; 3b, wherein the pressure and the temperature of the flowing mass are measured, and the measured values are supplied to the process computer 4. If there is a deviation from the intended value determined by the program of computer 4, the latter gives the required adjustment signals to feed extruders 2; 3, particularly to their drive means 13; 14, causing them to stay exactly within the predetermined values. From measurement heads 2b; 3b, the material arrives at filters 15; 16, in which the filtration factor is adjustable to the given requirements by means of interchangeable filter sieves. The material flows from filters 15; 16 through heatable conduits to charge control valves 17; 18, which also receive their adjustment signals directly from process computer 4. The charge control valves 17; 18 are positioned at the shortest possible distance before feed openings 5a; 5b of extrusion cylinder 5 of main extruder 1. Subsequently, feed zones 19; 20 (encased by chequered identification) of two-sided extruder screw 6, at a pressure of 2 to 15 MPa, are continuously supplied with flowable material, with the settings of charge control valves 17; 18 corresponding to these pressures. This insures that the material between the threads is substantially free of voids. Because of the opposite pitch of the threads of sides 6b; 6b of screw 6, the two streams of material introduced into feed openings 5a; 5b, at a rotation to the right of screw 6 are moved towards the center of extrusion cylinder 5. From feed zones 19; 20, which by means of connected tempering units 19a; 20a are equipped not only for heating but also for cooling in the direction towards the center of the extrusion cylinder 5, there follow intensive cooling zones 21; 22 (encased with striped identification) to each of which is assigned a cooling unit 21a; 22a, in order to cool extrusion cylinder 5 from the outside. In intensive cooling zones 21; 22, screw 6 provided with hollow spaces is cooled from the inside in the same way, and the extruder screw 6 has been connected to cooling units 23; 24 for this purpose. In order to determine the inner temperatures of screw 6, on the sides 6a; 6b, are provided temperature measuring devices 25; 26. Tempering units 19a; 20a, cooling units 21a; 22a; 23; 24 and temperature measuring devices 25; 26 are connected to the process computer 4 and are compared therein with the present program and controlled by control signals. Cooling units 21a; 22a; 23; 24 provide that the flowing material is quickly and completely cooled to below the individual solidification point. At this point, there starts an increased compression, whereby the solid material is compressed and an increase of pressure in the range of up to 1000 MPa or more occurs. This increas in pressure is attainable because it is possible to almost eliminate flow leakage due of the material to be shaped to its solid state, A further effect of the build-up of positive pressure is that the heat of the friction, which could cause damage to the material being extruded if not dissipated, can safely and quickly be eliminated because of simultaneous cooling of extrusion cylinder 5 and the inside of screw 6. Subsequently, the two streams of material leave the system of the two-sided screw 6 in a solid state through separate discharge openings 5c; 5d of the extrusion cylinder 5, which are continued in the discharge head 9. In order to influence the temperature of the extruding material in the discharge zones 27; 28 (encased by chequered identification), discharge head 9 includes additional tempering units 29; 30. The pressure and the temperature of the streams of material are measured at positions 31; 32, where pressure and temperature sensors 31; 32 are located. The data obtained in those locations also reach process computer 4.

The above explanation of the work cycle of the method proceeds from the fact that the reaction forces of the two sides of the machine, respectively on sides 6a; 6b of screw 6 are equal and compensate each other. This state of equilibrium of forces is continuously adjusted during the operation of the extrusion apparatus, because the forces which are effective on the inside are subjected to constant changes, causing screw 6 frequently to slide back and forth because of the flowing mass. A return to a state of equilibrium of all the effective forces within the extrusion apparatus, after a slight change, is attained because of the following:

with respect to extrusion cylinder 5 and extruder screw 6, the highest possible precision in the manufacture of such equipment results in a mechanical evenness and congruent conveyer performance and thus an even pressure build-up;

by means of the position indicator 12 the mechanical position of the screw 6 with respect to a lateral shift in the range of ±15 mm is signalized with high speed;

at a shift of the screw 6 out of the center position in the direction of side 6a which is initially registered by position indicator 12, the feed pressure is increased by means of the charge control valve 17 via process computer 4, resulting in a counter-effect; a similar counter-effect in the oppposite direction occurs with a shift of screw 6 in the direction of side 6b.

if an increase of the feed pressure by means of charge control valve 17 is insufficient to prevent an undesired movement of screw 6, the feed pressure is reduced at charge control valve 18;

and finally, it is also possible to adjust to increase of the cooling performance in cooling zone 21, a decrease of the performance of the cooling zone 22, or a change of strength of cooling units 23; 24 following the signals given by process computer 4.

In the exceptional case that the equilibrium of forces cannot be restored by the operation of process computer 4, extruder screw 6 will run against the axial thrust bearings 10, and the extrusion apparatus will be turned off by means of a pressure indicator located at axial thrust bearings 10.

The intended positive pressure of 1000 MPa leads not only to the condition of the equilibrium of forces on both sides 6a; 6b of screw 6, but requires also a greater mechanical stability of individual elements of the extrusion apparatus. Thus, the diameter of screw 6 has to be 2 to 8 times that of the screws in use at this time. Also the screw flanges have to be several times wider than the ones normally used. The core diameter of screw 6 is kept almost constant over the entire length. In the interest of intensive heat exchange, the depth of the groove should be small and should measure less than two mm. Changing the pitch and/or reducing the free cross-section of the groove of screw 6 contribute to attaining the required compression. Extrusion cylinder 5 and screw 6 contain a shielded construction. In order to attain the pressure resistance of the discharge head 9, reinforcing housings 9a; 9b; 9c are made of highest-quality steel. This is also the case for all other parts of the apparatus which are exposed to high pressures.

At discharge openings 5c; 5d of the extrusion cylinder 5, which evolve into discharge head 9, there is connected a pressure-resistant transitional part 33 with tempering units 34; 35, which alternatively makes possible a heating or cooling of the mass to be extruded.

As a processing tool, there can, for example, be provided a bicomponent nozzle of two ducts, which is equipped with pressure and temperature sensors, as well as a nozzle tempering device. The material leaves the extrusion apparatus through the bicomponent nozzle.

Description of Specific Embodiment

Figure 2:
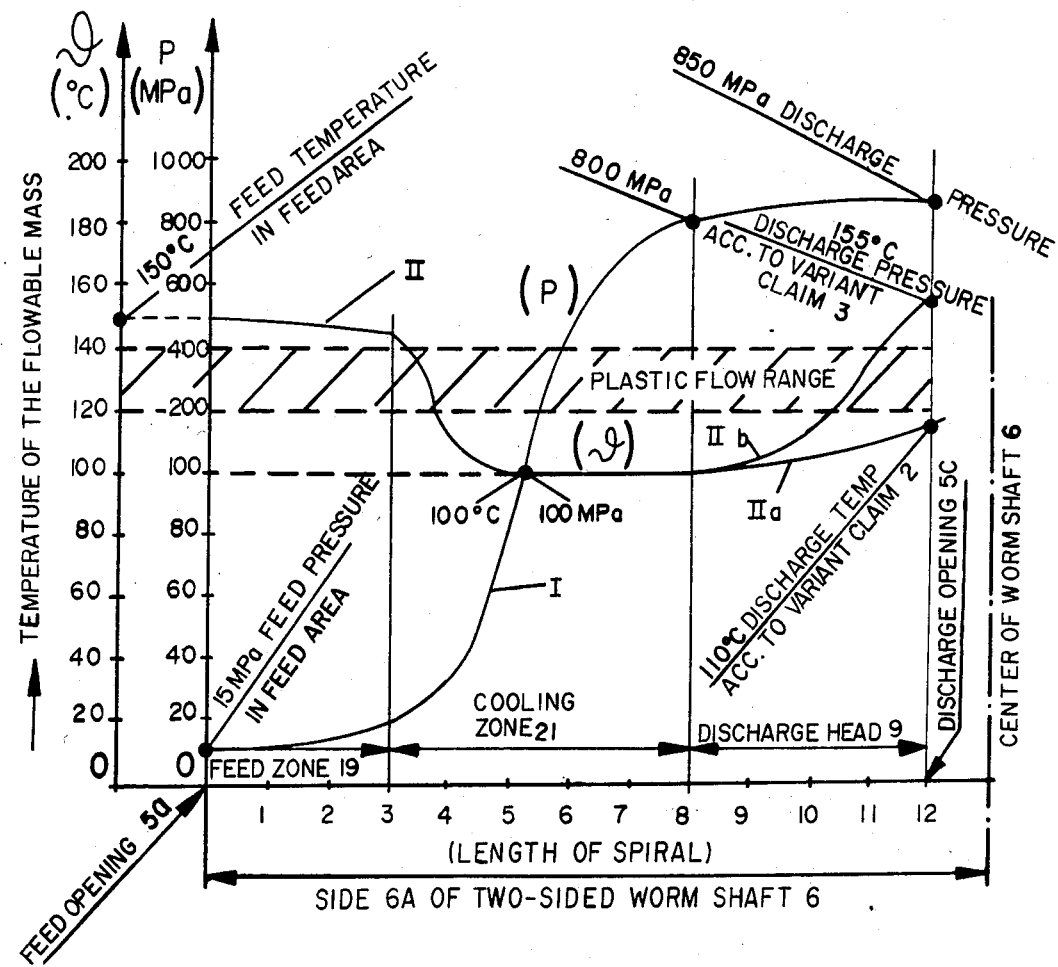

The example of the diagram according to FIG. 2 illustrates in simplified and condensed representation the pressure cycle and the cycle of the working temperatures in the corresponding left section of extrusion cylinder 5 of side 6 a of two-sided extruder screw 6. Polyethylene is provided as the material to be extruded.

On the vertical line drawn on the far left, the working temperatures are plotted in Celsius degrees of 0° to 200°. The vertical line to the right of the temperature line is provided with a grading chart for the pressure p, which exists in extrusion cylinder 5 and which is indicated in units from 0 to 1000 MPa. The horizontal axis of the diagram represents the length of the left section of extrusion cylinder 5 or side 6 a of screw 6, whereby within this length, there are located in the indicated order feed zone 19, cooling zone 21 and discharge head 9. At the beginning of this line, there is provided feed opening 5a and at the end discharge opening 5c. To the right of the vertical line of discharge opening 5, there is also drawn a vertical line for the center of screw 6. In the example of pressure curve I, it can be seen that the material to be extruded is supplied to feed zone 19 at a pressure of 15 MPa, and that in cooling zone 21, a very high pressure increase is registered, which at a working temperature of 100° C. has the value of 100 MPa and, subsequently, at a constant temperature, increases sharply to 800 MPa. Subsequently, the pressure increases further and at the discharge opening 5c finally reaches 850 MPa. In a variant, according to which the solidified mass is discharged from the extrusion cylinder 5, the discharge temperature is 110° C. at a pressure of 850 MPa (temperature curve section IIa). According to a second variant, whereby the solidified polyethylene is again melted before its discharge and subsequently discharged from the extrusion cylinder in the form of a flowing stream, the discharge temperature reaches 155° C. (temperature curve section IIb). This working method is especially of interest, if sides 6a and 6b of two-sided screw 6 are each processing different materials, which subsequently should be mixed, for which the pressure, which normally can be produced by conventional extrusion apparatuses is insufficient. If one considers also the initial cycle of the temperature curve II, then it becomes clear that the feed temperature in the area of the feed opening 5a is 150° C., which in cooling zone 21 very quickly is decreased to 100° C., and that the plastic flow range of polyethylene lies in the range of this temperature drop at 120° C. to 140° C.

In accordance with the flowable materials being utilized and the possible method variants, the pressure and temperature cycles, of course, can have varying characteristics.

We claim:

1. A method for shaping a plastic material, comprising bringing said material into a flowable state in two feed extruders, each of said feed extruders being connected to a main extruder, the main extruder comprising a two-sided extruder screw mounted in an extrusion cylinder having a feed opening at each of its ends, each of said feed openings being connected to a respective one of said feed extruders, continuously conveying said material in said flowable state at a slight positive pressure from said feed extruders, through said feed openings, into said extrusion cylinder, said screw being movable over a short distance in an axial direction by means of said material, conveying the material by means of the extruder screw while cooling the material to a temperature below the solidification point, from the outside by a cooling source in the extrusion cylinder and from the inside by a cooling source in the interior of the extruder screw, the two sides of the screw being fixedly connected to each other and being of opposite pitch of their threads such that the material is conveyed to and discharged at a discharge location at the center of the cylinder, said slight positive pressure being approximately equal at both said sides and said slight positive pressure assuring that the material between the threads of the screw is free from voids, the material which is solidified and the flowable material upstream of the solidified material being conveyed by the screw to the discharge location at a very high positive pressure enabled by the solidification, unbalancing of said pressures at said respective sides shifting the screw axially toward the side at which the pressure is lower, the shifting of the screw being detected by a position indicator connected to a process computer, the process computer responding to the shifting by sending pulses to actuate control valves connected to the feed extruders to change the flow of the material conveyed by the feed extruder so as to increase the pressure on the side having lower pressure and decrease the pressure on the other side.

2. The method of claim 1 wherein the feed extruders are supplied with different plastic materials.

3. The method of claim 1, wherein the feed extruders are supplied with identical plastic materials.

4. The method of claim 1 wherein the two flows of material are kept separate during discharge.

5. The method of claim 1 wherein the flows of material are mixed after discharge but before processing in a molding tool.

6. The method of claim 1 wherein said slight positive pressure is 2 to 15 mPa and said very high positive pressure is at least 300 mPa.

7. The method of claim 6 wherein said very high positive pressure is up to 1,000 mPa.

* * * * *